United States Patent
Xu et al.

(10) Patent No.: US 12,213,207 B2
(45) Date of Patent: Jan. 28, 2025

(54) ENHANCED UP FUNCTION REQUESTED PFCP ASSOCIATION RELEASE

(71) Applicant: Telefonaktiebolaget LM Ericsson (publ), Stockholm (SE)

(72) Inventors: Juan Xu, Shanghai (CN); Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 456 days.

(21) Appl. No.: 17/431,297

(22) PCT Filed: Feb. 13, 2020

(86) PCT No.: PCT/CN2020/075071
§ 371 (c)(1),
(2) Date: Aug. 16, 2021

(87) PCT Pub. No.: WO2020/164541
PCT Pub. Date: Aug. 20, 2020

(65) Prior Publication Data
US 2022/0132623 A1   Apr. 28, 2022

(30) Foreign Application Priority Data
Feb. 14, 2019   (WO) ................ PCT/CN2019/075050

(51) Int. Cl.
*H04W 56/00*   (2009.01)
*H04W 76/10*   (2018.01)
*H04W 76/30*   (2018.01)

(52) U.S. Cl.
CPC ........... *H04W 76/30* (2018.02); *H04W 76/10* (2018.02)

(58) Field of Classification Search
None
See application file for complete search history.

(56) References Cited

U.S. PATENT DOCUMENTS

2015/0055446 A1\*   2/2015   Avula .................... H04W 76/19
                                                            370/216
2016/0286598 A1\*   9/2016   Avula .................. H04W 56/002
(Continued)

FOREIGN PATENT DOCUMENTS

CN   109155949 A   1/2019
CN   109167670 A   1/2019
(Continued)

OTHER PUBLICATIONS

Notice of Reasons for Refusal for Japanese Patent Application No. 2021-544924, mailed Sep. 5, 2022, 4 pages.
(Continued)

*Primary Examiner* — Sithu Ko
(74) *Attorney, Agent, or Firm* — Withrow & Terranova, PLLC

(57) ABSTRACT

Embodiments of a method performed in a User Plane Entity (UPE) in a core network to perform a user plane initiated Packet Forwarding Control Protocol (PFCP) association release procedure are provided. In some embodiments, the method comprises, for each affected PFCP session, sending, to a Control Plane Entity (CPE), a PFCP session report request comprising an indicator that the PFCP session is being removed and one or more usage reports for the PFCP session, and deleting the PFCP session. The method further comprises sending, to the CPE, a PFCP association update request comprising information that indicates that the PFCP association update request is to initiate release of the PFCP association and an indicator that all non-zero usage reports for the affected PFCP session(s) have been reported. The method further comprises receiving, from the CPE, a PFCP association release request and sending, to the CPE, a PFCP association release response.

9 Claims, 8 Drawing Sheets

(56) References Cited

U.S. PATENT DOCUMENTS

| | | | | |
|---|---|---|---|---|
| 2019/0306742 A1* | 10/2019 | Yang | .................. | H04W 40/12 |
| 2020/0107403 A1* | 4/2020 | Frydman | ............. | H04W 88/182 |
| 2020/0127939 A1* | 4/2020 | Parker | ................... | G06F 9/5016 |
| 2020/0145432 A1* | 5/2020 | Verma | ................... | H04W 12/08 |
| 2020/0245163 A1* | 7/2020 | Jaya | ................... | H04L 47/2475 |

FOREIGN PATENT DOCUMENTS

| | | | | |
|---|---|---|---|---|
| JP | 2013223174 A | | 10/2013 | |
| WO | 2018066799 A1 | | 4/2018 | |
| WO | 2019024981 A1 | | 2/2019 | |
| WO | WO-2020093790 A1 * | | 5/2020 | ............ H04W 76/12 |

OTHER PUBLICATIONS

Author Unknown, "Technical Specification Group Services and System Aspects; Architecture enhancements for control and user plane separation of EPC nodes; Stage 2 (Release 15)," Technical Specification 23.214, Version 15.2.0, 3GPP Organizational Partners, Mar. 2018, 92 pages.

Author Unknown, "Technical Specification Group Services and System Aspects; System Architecture for the 5G System; Stage 2 (Release 15)," Technical Specification 23.501, Version 15.1.0, 3GPP Organizational Partners, Mar. 2018, 201 pages.

Author Unknown, "Technical Specification Group Core Network and Terminals; Interface between the Control Plane and the User Plane Nodes; Stage 3 (Release 15)," Technical Specification 29.244, Version 15.1.0, 3GPP Organizational Partners, Mar. 2018, 170 pages.

Author Unknown, "Technical Specification Group Core Network and Terminals; Interface between the Control Plane and the User Plane Nodes; Stage 3 (Release 15)," Technical Specification 29.244, Version 15.4.0, 3GPP Organizational Partners, Dec. 2018, 194 pages.

Ericsson, "C4-190167: Up function requested PFCP Association Release," Third Generation Partnership Project (3GPP), TSG-CT WG4 Meeting #89, Feb. 25-Mar. 1, 2019, 16 pages, Montreal, Canada.

Ericsson, "C4-190337: Up function requested PFCP Association Release," Third Generation Partnership Project (3GPP), TSG-CT WG4 Meeting #89, Feb. 25-Mar. 1, 2019, 16 pages, Montreal, Canada.

Nokia, et al., "C4-182039: Corrections to the Association Setup, Update and Release Procedures," Third Generation Partnership Project (3GPP), TSG CT4 Meeting #83, Feb. 26-Mar. 2, 2018, 3 pages, Montreal, Canada.

International Search Report and Written Opinion for International Patent Application No. PCT/CN2020/075071, mailed May 9, 2020, 8 pages.

Gupta, Akhil, et al., "A Survey of 5G Network: Architecture and Emerging Technologies," IEEE Access, vol. 3, Aug. 7, 2015, pp. 1206-1232.

Extended European Search Report for European Patent Application No. 19193214.4, mailed Feb. 20, 2020, 6 pages.

Examination Report for European Patent Application No. 19193214.4, mailed Mar. 10, 2021, 7 pages.

Intention to Grant for European Patent Application No. 19193214.4, mailed Jun. 16, 2021, 5 pages.

Extended European Search Report for European Patent Application No. 21192385.9, mailed Jan. 17, 2022, 6 pages.

Examination Report for Indian Patent Application No. 202147040709, mailed Mar. 11, 2022, 5 pages.

* cited by examiner

ENHANCED UP FUNCTION REQUESTED PFCP ASSOCIATION RELEASE

This application is a 35 U.S.C. § 371 national phase filing of International Application No. PCT/CN2020/075071, filed Feb. 13, 2020, which claims the benefit of International Application No. PCT/CN2019/075050, filed Feb. 14, 2019, the disclosures of which are incorporated herein by reference in their entireties.

TECHNICAL FIELD

The present disclosure relates to a core network of a cellular communications system and, more specifically, to User Plane (UP) initiated Packet Forwarding Control Protocol (PFCP) association release in a core network utilizing an architecture having a separated control plane and user plane.

BACKGROUND

In Third Generation Partnership Project (3GPP) Release 14 the network functions Serving Gateway (S-GW), Packet Data Network (PDN) Gateway (P-GW), and Traffic Detection Function (TDF) were each split into a Control Plane (CP) and User Plane (UP) part, forming the S-GW CP (SGW-C)/S-GW UP (SGW-U), P-GW CP (PGW-C)/PGW-UP (PGW-U), and TDF CP (TDF-C)/TDF UP (TDF-U) (see 3GPP TS 23.214 V15.2.0). The interface (called Sx) and protocol, called Packet Forwarding Control Protocol (PFCP), that is used to communicate between the CP and UP parts are also standardized by 3GPP (3GPP TS 29.244 V15.1.0). A similar split exists in Fifth Generation (5G) where the CP is called Session Management Function (SMF) and the UP is called User Plane Function (UPF) and the corresponding interface is called N4 (3GPP TS 23.501 V15.1.0).

More specifically, Control and User Plane Separation (CUPS) for the core network (i.e., for the Evolved Packet Core (EPC)) has been standardized by the 3GPP. CUPS provides architecture enhancements for the separation of the CP and UP functionality in, e.g., the EPC's S-GW, P-GW, and TDF. This enables flexible network deployment and operation by distributed or centralized deployment and the independent scaling between CP and UP functions (also referred to herein as Control Plane Entities (CPEs) and User Plane Entities (UPEs)), while not affecting the functionality of the existing nodes subject to this CUPS.

FIG. 1 illustrates architecture principles for CUPS. As illustrated, CUPS introduces three network interfaces, namely, a Sxa interface, a Sxb interface, and a Sxc interface between the CP and UP functions of the S-GW, P-GW, and TDF, respectively. 3GPP has adopted the following high-level principles:

The CP function terminates the CP protocols: General Packet Radio Service Tunneling Protocol CP (GTP-C), Diameter (Gx, Gy, Gz).
A CP function can interface multiple UPFs, and a UPF can be shared by multiple CP functions.
A User Equipment device (UE) is served by a single SGW-C but multiple SGW-Us can be selected for different PDN connections. A UP data packet may traverse multiple UPFs.
The CP function controls the processing of packets in the UPF by provisioning a set of rules in Sx sessions, i.e. Packet Detection Rules (PDRs) for packet inspection, Forwarding Action Rules (FARs) for packet handling (e.g., forward, duplicate, buffer, drop), Quality of Service (QoS) Enforcement Rules (QERs) to enforce QoS policing on the packets, and Usage Reporting Rules (URRs) for measuring the traffic usage.
All the 3GPP features impacting the UPF (Primary Component Carrier (PCC), charging, lawful interception, etc.) are supported, while the UPF is designed as much as possible 3GPP agnostic. For example, the UPF is not aware of bearer concept.
Charging and usage monitoring are supported by instructing the UPF to measure and report traffic usage, using URR(s). No impact is expected to the Offline Charging System (OFCS), the Online Charging System (OCS), and the Policy and Charging Rules Function (PCRF).
The CP or UP function is responsible for General Packet Radio Service Tunneling Protocol UP (GTP-U) Fully Qualified Tunnel Endpoint Identifier (F-TEID) allocation.
A legacy S-GW, P-GW, and TDF can be replaced by a split node without effecting connected legacy nodes.

Several candidate protocols were assessed for the interfaces between the CP and UP functions. However, 3GPP decided to define a 3GPP native protocol with Type-Length-Value (TLV) encoded messages over User Datagram Protocol (UDP)/Internet Protocol (IP) for the Sxa, Sxb, and Sxc interfaces. This 3GPP native protocol is referred to as the PFCP protocol. An illustration showing the PFCP protocol used in the CP function and UPF protocol stacks is provided in FIG. 2.

PFCP has the following main properties:
One Sx association shall be setup between a CP function and a UPF before being able to establish Sx sessions on the UPF. The Sx association may be established by the CP function (mandatory support) or by the UPF (optional support). A Sx session is established in the UPF to provision rules instructing the UPF how to process a certain traffic. A Sx session may correspond to an individual PDN connection, TDF session, or this can be a standalone session not tied to any PDN connection/TDF session, e.g. for forwarding Dynamic Host Configuration Protocol (DHCP)/RADIUS/DIAMETER signaling between the PGW-C and PDN (SGi).
Sx node related procedures:
Sx association setup/update/release procedures;
Heartbeat procedure to check that a PFCP peer is alive;
Load control and overload control procedures to balance the load across UPFs and reduce signaling towards the UPF in overload;
Sx Packet Flow Description (PFD) management procedure to provision PFDs for one or more application identifiers in the UPF (Sponsored Data Connectivity Improvement (SDCI)).
Sx session related procedures:
Sx session establishment/modification/deletion procedures;
Sx session report procedure to report traffic usage or specific events (e.g., arrival of a downlink data packet, start of an application).
Data forwarding between the CP and UP functions is supported by GTP-U encapsulation, e.g. for forwarding Router Solicitation (RS)/Router Advertisement (RA)/DHCP signaling between the UE and the PGW-C, or forwarding UP data to the SGW-C when buffering of downlink packets is done in the CP function.
PFCP supports reliable delivery of messages.
New Domain Name System (DNS) procedures are defined for UPF selection. The CP function selects a UPF based on DNS or local configuration, the capabilities of the UPF, and the overload control information provided by the UPF.

Note that the term "Sx association" is used in EPC, whereas "PFCP association" is used in 5GC. However, these two terms refer to the same thing.

SUMMARY

Systems and methods are disclosed for User Plane (UP) initiated Packet Forwarding Control Protocol (PFCP) association release in a core network utilizing a Control and User Plane Separation (CUPS) architecture. Embodiments of a method performed in a User Plane Entity (UPE) in a core network of a cellular communications system to perform a UP initiated PFCP association release procedure is provided. In some embodiments, the method comprises, for each PFCP session of one or more PFCP sessions affected by release of a PFCP association, sending to a Control Plane Entity (CPE) a PFCP session report request for the PFCP session, the PFCP session report request comprising an indicator that the PFCP session is being removed and one or more usage reports for the PFCP session, and deleting the PFCP session at the UPE. The method further comprises sending, to the CPE, a PFCP association update request comprising information that indicates that the PFCP association update request is to initiate release of the PFCP association and an indicator that all non-zero usage reports for the one or more PFCP sessions affected by release of the PFCP association have been reported. The method further comprises receiving, from the CPE, a PFCP association release request and sending, to the CPE, a PFCP association release response.

In some embodiments, the method further comprises, prior to sending the PFCP session report request for each PFCP session of the one or more PFCP sessions affected by release of the PFCP association, receiving, from the CPE, a PFCP association setup request for the PFCP association that comprises or is otherwise associated with an indicator that the CPE supports an enhanced UP initiated PFCP association release procedure and sending, to the CPE, a PFCP association setup response that comprises or is otherwise associated with an indicator that the UPE supports the enhanced UP initiated PFCP association release procedure. Further, in some embodiments, the steps for UP initiated PFCP release are performed by the UPE upon determining, by the UPE, that release of the PFCP association is needed and both the UPE and the CPE support the enhanced UP initiated PFCP association release procedure.

In some embodiments, the UPE is a Serving Gateway UP (SGW-U) and the CPE is a Serving Gateway Control Plane (CP) (SGW-C) in an Evolved Packet Core (EPC) having a CUPS architecture; or the UPE is a Packet Data Network (PDN) Gateway UP (PGW-U) and the CPE is a PDN Gateway CP (PGW-C) in an EPC having a CUPS architecture; or the UPE is a Traffic Detection Function UP (TDF-U) and the CPE is a Traffic Detection Function CP (TDF-C) in an EPC having a CUPS architecture.

In some embodiments, the UPE is a UP Function (UPF) in a Fifth Generation (5G) Core (5GC) and the CPE is a CP Network Function (NF) in the 5GC.

Embodiments of a method performed in a CPE in a core network of a cellular communications system to perform a UP initiated PFCP association release procedure are disclosed. In some embodiments, the method comprises, for each PFCP session of one or more PFCP sessions affected by release of a PFCP association, receiving from a UPE a PFCP session report request for the PFCP session, the PFCP session report request comprising an indicator that the PFCP session is being removed and one or more usage reports for the PFCP session, and deleting the PFCP session at the CPE. The method further comprises receiving, from the UPE, a PFCP association update request comprising information that indicates that the PFCP association update request is to initiate release of the PFCP association and an indicator that all non-zero usage reports for the one or more PFCP sessions affected by release of the PFCP association have been reported. The method further comprises sending, to the UPE, a PFCP association release request and receiving, from the UPE, a PFCP association release response.

In some embodiments, the method further comprises, for each PFCP session of one or more PFCP sessions affected by release of a PFCP association, terminating a PDN connection for the PFCP session.

In some embodiments, the method further comprises, prior to receiving the PFCP session report request for each PFCP session of the one or more PFCP sessions affected by release of the PFCP association, sending, to the UPE, a PFCP association setup request for the PFCP association that comprises or is otherwise associated with an indicator that the CPE supports an enhanced UP initiated PFCP association release procedure and receiving, from the UPE, a PFCP association setup response that comprises or is otherwise associated with an indicator that the UPE supports the enhanced UP initiated PFCP association release procedure. In some embodiments, the steps for user initiated PFCP association release are performed upon determining, by the CPE, that both the UPE and the CPE support the enhanced UP initiated PFCP association release procedure.

In some embodiments, the UPE is a SGW-U and the CPE is a SGW-C in an EPC having a CUPS architecture; or the UPE is a PGW-U and the CPE is a PGW-C in an EPC having a CUPS architecture; or the UPE is a TDF-U and the CPE is a TDF-C in an EPC having a CUPS architecture.

In some embodiments, the UPE is a UPF in a 5GC and the CPE is a CP NF in the 5GC.

Embodiments of a network node that implements a UPE for performing a UP initiated PFCP association release procedure in a core network of a cellular communications system are also disclosed.

Embodiments of a network node that implements a CPE for performing a UP initiated PFCP association release procedure in a core network of a cellular communications system are also disclosed.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
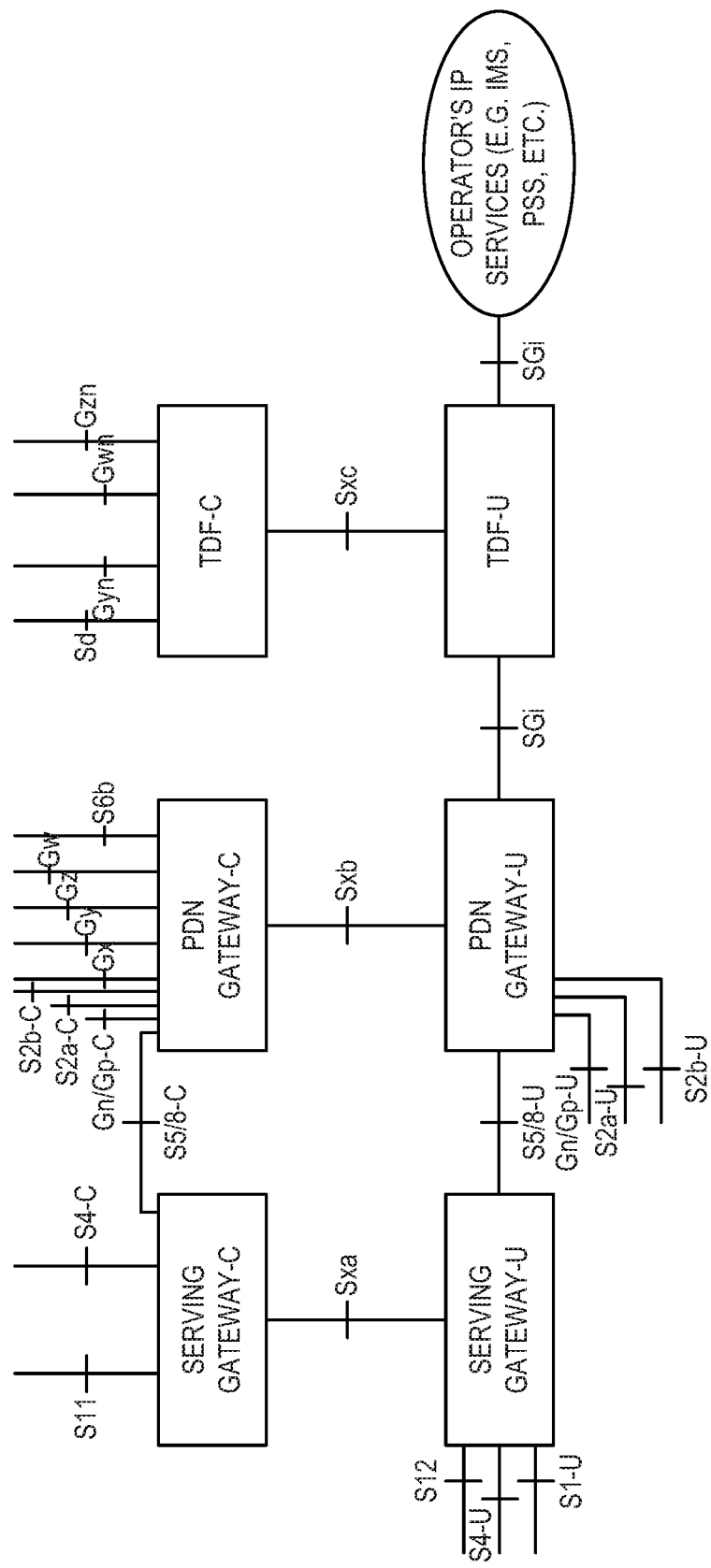
FIG. 1 illustrates architecture principles for Control and User Plane Separation (CUPS) for the core network in a cellular communications system.
Figure 2:
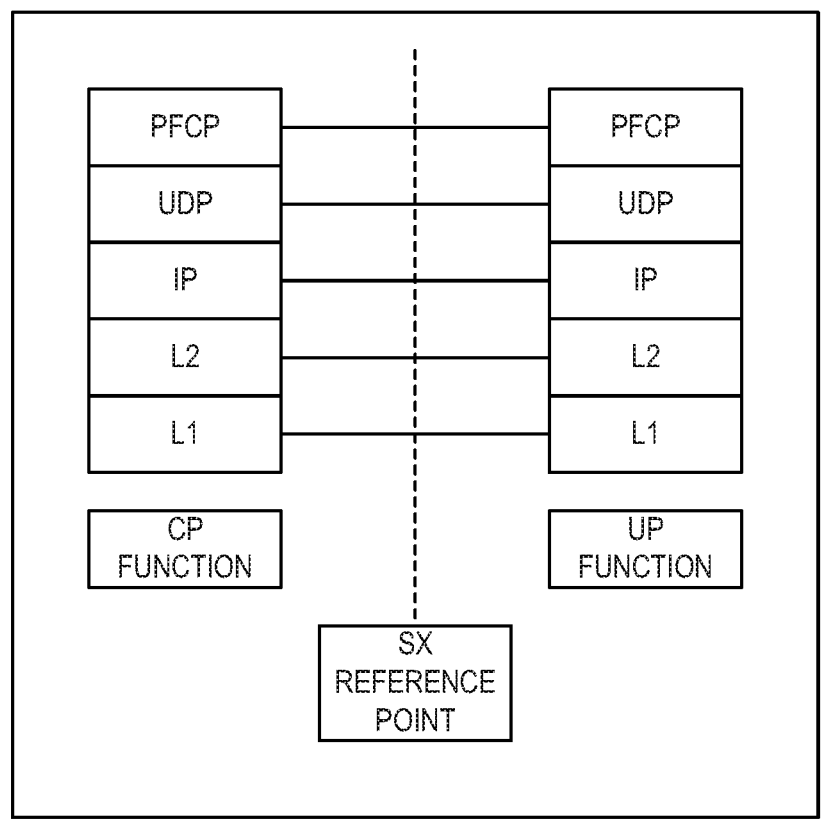
FIG. 2 is an illustration of the Control Plane (CP) function and the User Plane (UP) function protocol stacks, including the Packet Forwarding Control Protocol (PFCP) protocol.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s). The existing requirements when it comes to User Plane (UP) function initiated Packet Forwarding Control Protocol (PFCP) Association Release procedure are specified in 3GPP Technical Specification (TS) 29.244-15.4.0. In general, if the UP Function (UPF) is required to initiate the PFCP Association Release procedure, the UPF indicates this to the Control Plane (CP) function using a PFCP Association Update Request message. Then, the CP function is responsible for initiating the PFCP Association Release procedure either as soon as possible, or before a Graceful Release Period has expired. Note that while the embodiments described herein are described with respect to PFCP association (e.g., in Fifth Generation Core (5GC)), the embodiments are equally applicable to Sx association (e.g., in Evolved Packet Core (EPC)).

The relevant sections of 3GPP TS 29.255 V15.4.0 are copied below for convenience with the relevant text highlighted.

---

6.2.7.3 PFCP Association Update Procedure Initiated by UP Function 6.2.7.3.1 UP Function Behaviour The UP function initiates the PFCP Association Update procedure to report changes to the PFCP association to the CP function, e.g. change of optional features, change of the available user plane resources, an indication to request to release the PFCP association.
The UP function may send an PFCP Association Update Request to request the CP function to perform the release of the PFCP association, optionally providing a Graceful Release Period. After reception of the PFCP Association Update Response, the UP function shall consider that the PFCP association is still setup until receiving an PFCP Association Release Request.

6.2.7.3.2 CP Function Behaviour

When receiving an PFCP Association Update Request, the CP function:
shall update the list of optional features of the UP function, when received;
shall send an PFCP Association Update Response with an appropriate error cause if the Node ID is not known by the CP Function;
shall return an PFCP Association Update Response with a successful cause value if the PFCP Association Update Request is handled successfully.
If the UP function has requested to release the PFCP association in the PFCP Association Update Request, the CP function should initiate an PFCP Association Release Request to release the PFCP association, as soon as possible if no Graceful Release Period was included in the request or before the expiry of the Graceful Release Period.
If the UP function has included User Plane IP Resource Information IE in the PFCP Association Update Request

| 6.2.7.3 PFCP Association Update Procedure Initiated by UP Function |
| --- |
| message, the CP function shall use it to overwrite the User Plane IP Resource Information previously received from the UP function.<br>6.2.8 PFCP Association Release Procedure<br>6.2.8.1 General |
| The PFCP Association Release procedure shall be used to terminate the PFCP association between the CP Function and the UP Function due to e.g. OAM reasons. The PFCP Association Release Request may be initiated by the CP function.<br>6.2.8.2 CP Function Behaviour |
| If the CP function initiates the PFCP Association Release procedure to release an existing PFCP association, the CP function:<br>shall delete locally all the PFCP sessions related to that PFCP association when receiving the PFCP Association Release Response with the cause value success.<br>6.2.8.3 UP Function behaviour |
| When the UP function receives an PFCP Association Release Request, the UP function:<br>shall delete all the PFCP sessions related to that PFCP association locally;<br>shall delete the PFCP association and any related information (e.g. Node ID of the CP function);<br>shall send an PFCP Association Release Response with a successful cause.<br>NOTE: The UP function always accepts an PFCP Association Release Request. |

The inventors have found that the existing UPF initiated PFCP Association Release procedure is not efficient and, to some extent, is also difficult to implement. More specifically, the use cases discussed here are for when the UPF is able to request a PFCP Association Release in a controllable manner, e.g. when the UPF is brought down by Operations and Management (O&M) personnel for a maintenance reason, i.e. not due to a failure which leads to the UPF being shut-down in a disruptive manner. In these use cases, operators require that usage reports, which are created for charging (including for both online and offline charging) or policy control (e.g., based accumulated usage), be sent to the CP function in order to create a Charging Data Record (CDR) or credit/quota handling before the PFCP session is torn down.

Therefore, a reasonable UPF implementation should support a Graceful Release Period (GRP), which can be used by the CP function to release (tear down) all PFCP sessions related to the PFCP Association to be released. However, the amount of time needed by the CP function to release those affected PFCP sessions depends on the current load in the CP function, Central Processing Unit (CPU)/memory capability in the CP function, signaling bandwidth between the CP and UP, as well as the number of UPFs that are connected to the CP function, all of which are dynamically changing. Thus, it is impossible to require the UPF to consider these when providing the GRP to the CP function. Further, it is likely that the UPF is configured with a static Graceful Release Period in most implementations.

If the GRP is too short, the CP function is not able to release all of the affected PFCP sessions. As a result, some usage reports will be lost, which is not acceptable. If the GRP is too long, the CP function may initiate the PFCP Session Releases (for the affected PFCP sessions) in its background signaling, i.e. the PFCP Association Release procedure will take longer than necessary, which in turn negatively affects total network capacity because the CP function does not establish a new PFCP session on this UPF, which is also not acceptable.

In addition, the CP function needs use the GRP to delete PFCP sessions to get the final usage report. Some of the PFCP sessions may have zero usage. In such a case, it is not required to use explicit signaling (PFCP Session Delete Request/Response) over the interface between the CP and UP to delete the PFCP session. So, in the current UPF initiated PFCP Association Release procedure, unnecessary signaling is performed to delete PFCP sessions that have zero usage, which prolongs the whole signaling process to clean up the PFCP sessions.

A better mechanism for UPF initiated PFCP Association Release is desired.

Certain aspects of the present disclosure and their embodiments may provide solutions to the aforementioned or other challenges. In some embodiments, a new process for UPF initiated PFCP association release is provided. In some embodiments, a process for UPF initiated PFCP association release includes the following:

1. During a PFCP Association Setup Procedure, a UPF and a CP function exchange their support of a new mechanism for UPF initiated PFCP association release, which is referred to herein as "Enhanced UP Function Initiated PFCP Association Release." However, this name for the new mechanism is only an example, and other names for this new mechanism may be used.
2. When the UPF determines that the PFCP Association is to be released, e.g. due to maintenance reasons, the UPF sends a PFCP Session Report Request to the CP function for each PFCP session which will be affected by the release of PFCP Association. For each PFCP session that will be affected by the release of the PFCP Association, the respective PFCP Session Report Request includes: (a) a new indicator (e.g., flag) indicating that the PFCP Session is to be deleted due to release of the PFCP Association and (b) a final non-zero usage report for each Usage Reporting Rule (URR) provisioned for the PFCP Session.
3. In each usage report created in step 2 above, the UPF includes a new usage report trigger indicating the usage report is generated due to the deletion of the respective PFCP Session affected by the release of the PFCP Association. Note that the indicator here in step 3 is different than the new indicator (e.g., flag) in step 2. The indicator in step 2 is a message level indication that indicates that the PFCP session is to be deleted due to release of the PFCP association. In this message, there are potentially many usage reports, where each of these usage reports includes the new usage indicator of step 3 that tells the reason why the usage report was created. This is the new usage report trigger.

4. When the UPF has sent all the non-zero usage reports for all the PFCP sessions which will be affected by the release of PFCP Association to the CP function, the UPF sends a PFCP Association Update Request, together with a new indicator (e.g., flag) indicating to the CP function that all remaining usage reports have been sent to the CP and the corresponding PFCP Sessions will be locally deleted.

Certain embodiments may provide one or more of the following technical advantage(s):

Embodiments of the present disclosure make sure that no usage reports will be lost, which impedes the charging and policy control function.

Embodiments of the present disclosure reduce potential signaling for PFCP Session Deletion for each affected PFCP Session (due to PFCP Association release).

Embodiments of the present disclosure effectively introduce a new UP initiated PFCP Session deletion (via a new indicator as described in step 2 above).

Figure 3:
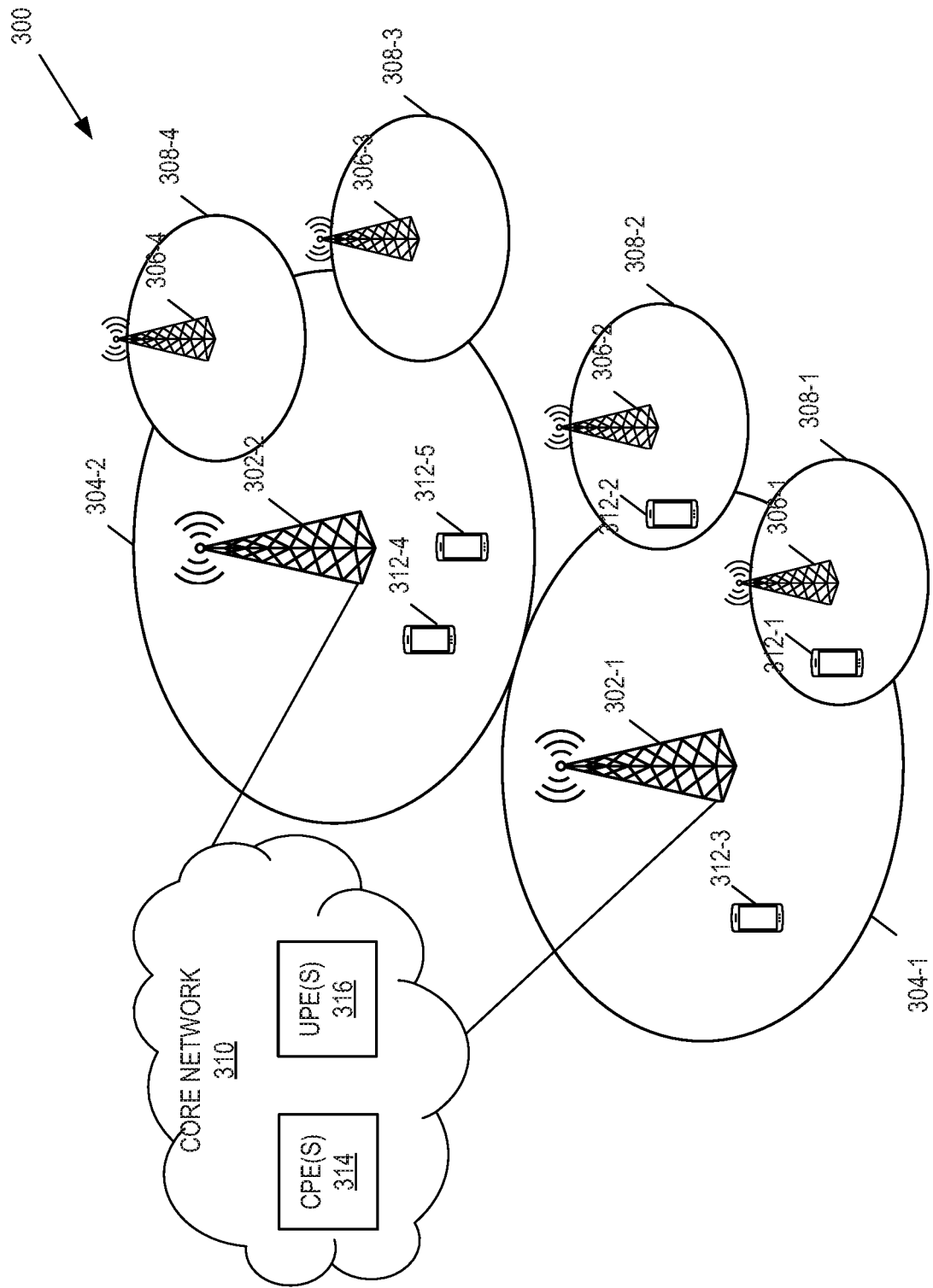
FIG. 3 illustrates one example of a cellular communications network in which embodiments of the present disclosure may be implemented.

FIG. 3 illustrates one example of a cellular communications network 300 in which embodiments of the present disclosure may be implemented. In the embodiments described herein, the cellular communications network 300 is a 3GPP LTE network or a 3GPP 5G NR network. In this example, the cellular communications network 300 includes base stations 302-1 and 302-2, which in LTE are referred to as eNBs and in 5G NR are referred to as gNBs, controlling corresponding macro cells 304-1 and 304-2. The base stations 302-1 and 302-2 are generally referred to herein collectively as base stations 302 and individually as base station 302. Likewise, the macro cells 304-1 and 304-2 are generally referred to herein collectively as macro cells 304 and individually as macro cell 304. The cellular communications network 300 may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The base stations 302 (and optionally the low power nodes 306) are connected to a core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as UEs.

Figure 4:
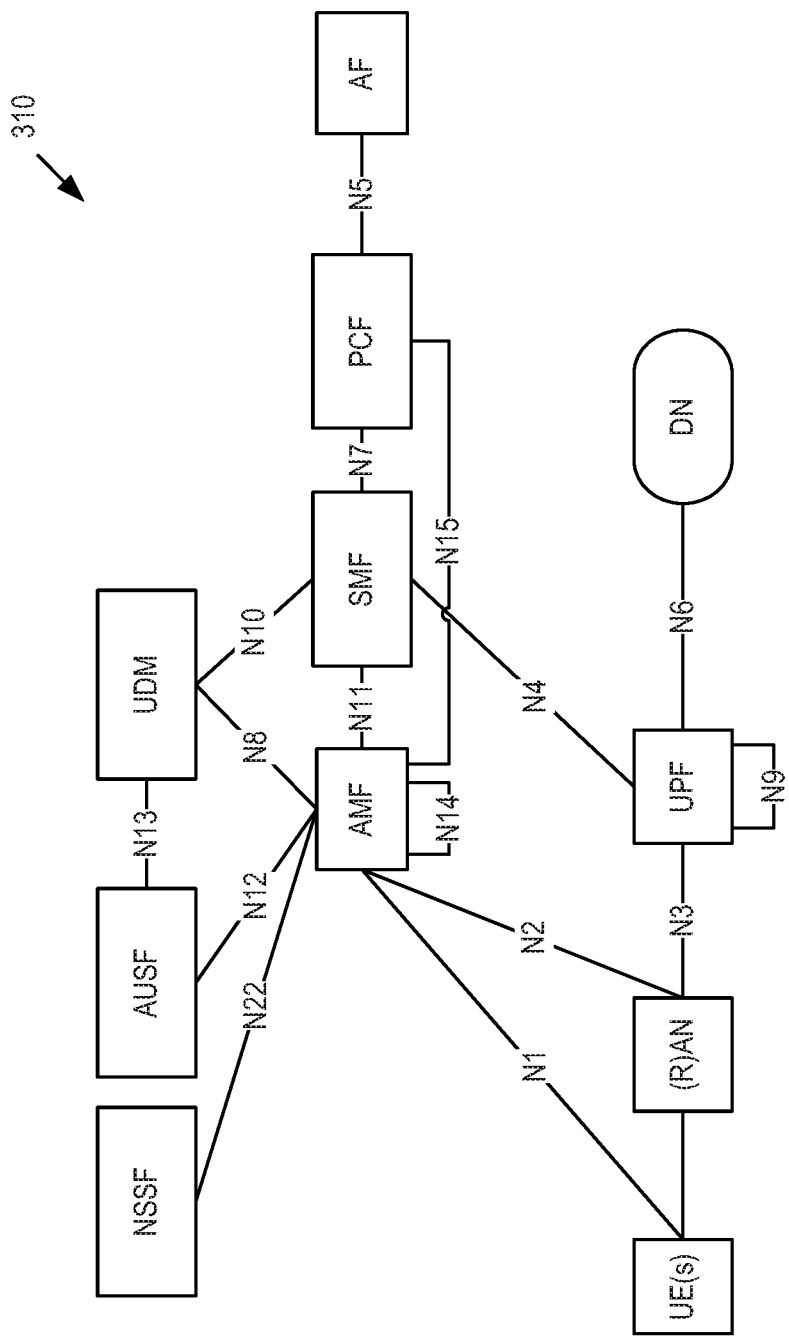
FIG. 4 illustrates a wireless communication system represented as a Fifth Generation (5G) network architecture composed of core Network Functions (NFs), where interaction between any two NFs is represented by a point-to-point reference point/interface.
Figure 5:
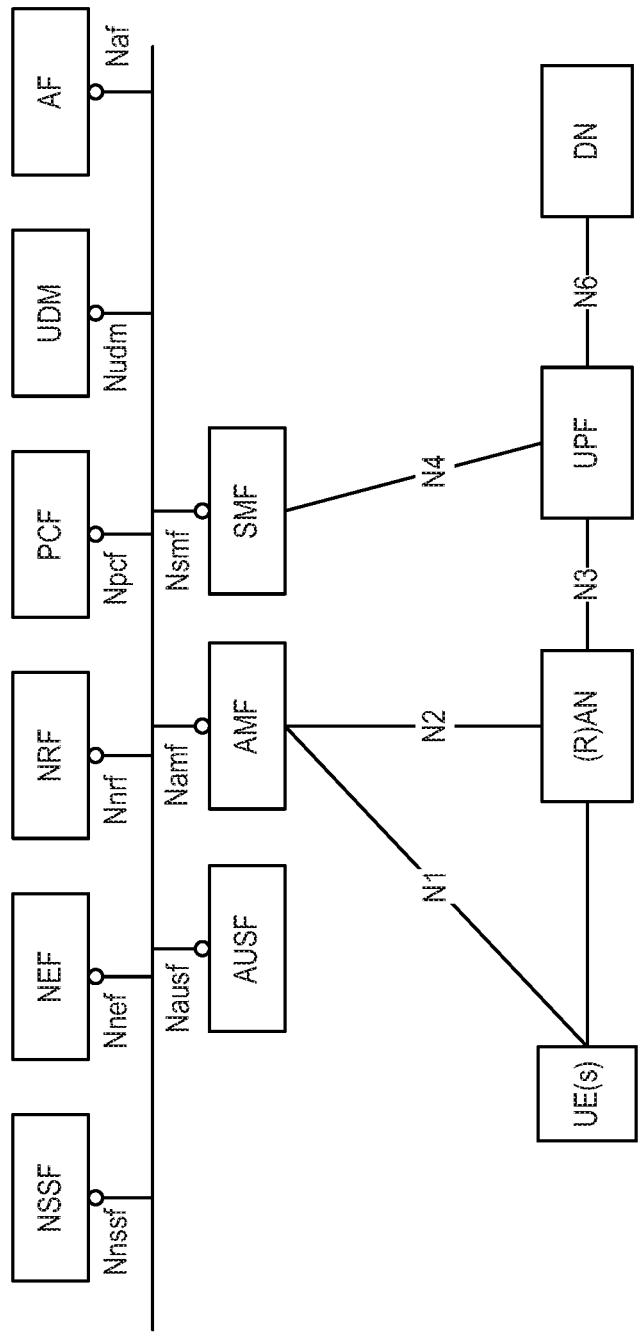
FIG. 5 illustrates a 5G network architecture using service-based interfaces between the NFs in the CP, instead of the point-to-point reference points/interfaces used in the 5G network architecture of FIG. 4.

The core network 310 includes one or more Control Plane Entities (CPEs) 314 and one or more User Plane Entities (UPEs) 316. In some embodiments, the core network 310 utilizes a Control and User Plane Separation (CUPS) architecture (e.g., the CUPS architecture of FIG. 1) in which the one or more CPEs 314 are separated from one or more corresponding UPEs 316 and where the CPE(s) 314 and UPE(s) 316 communicate via Sx interfaces using PFCP, as described above with respect to FIG. 1. For example, the CPEs 314 may include Serving Gateway CPs (SGW-Cs) (i.e., CP functions of a Serving Gateway (S-GW)), and the UPEs 316 may include S-GW UPs (SGW-Us) (i.e., UPFs of a S-GW). As another example, the CPEs 314 may include P-GW CPs (PGW-Cs) (i.e., CP functions of a P-GW), and the UPEs 316 may include P-GW UPs (PGW-Us) (i.e., UPFs of a P-GW). For 5G, the CPE(s) 314 may include a Session Management Function(s) (SMF(s)) and the UPF(s) 316 may include a 5G UPF(s) where the SMF(s) and UPF(s) communicate via the N4 interface as illustrated in FIGS. 4 and 5 discussed below. Note that the CPEs 314 are also referred to herein as CP functions, and the UPEs 316 are also referred to herein as UPFs.

Again, in some embodiments, the wireless communication system 300 is an LTE system where the core network 310 is an EPC using a CUPS architecture, such as that illustrated in FIG. 1 and described above. In some other embodiments, the wireless communication system 300 is a 5G NR system where the core network 310 is a 5GC. In this regard, FIG. 4 illustrates a wireless communication system represented as a 5G network architecture composed of core Network Functions (NFs), where interaction between any two NFs is represented by a point-to-point reference point/interface. FIG. 4 can be viewed as one particular implementation of the system 300 of FIG. 3.

Seen from the access side the 5G network architecture shown in FIG. 4 comprises a plurality of UEs connected to either a Radio Access Network (RAN) or an Access Network (AN) as well as an Access and Mobility Management Function (AMF). Typically, the R(AN) comprises base stations, e.g. such as eNBs or gNBs or similar. Seen from the core network side, the 5G core NFs shown in FIG. 4 include a Network Slice Selection Function (NSSF), an Authentication Server Function (AUSF), a Unified Data Management (UDM), an AMF, a SMF, a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating the UP and CP. The UP carries user traffic while the CP carries signaling in the network. In FIG. 4, the UPF is in the UP and all other NFs, i.e., the AMF, SMF, PCF, AF, AUSF, and UDM, are in the CP. Separating the user and control planes guarantees each plane resource to be scaled independently. It also allows UPFs to be deployed separately from CP functions in a distributed fashion. In this architecture, UPFs may be deployed very close to UEs to shorten the Round Trip Time (RTT) between UEs and the data network for some applications requiring low latency.

The core 5G network architecture is composed of modularized functions. For example, the AMF and SMF are independent functions in the CP. Separated AMF and SMF allow independent evolution and scaling. Other CP functions like the PCF and AUSF can be separated as shown in FIG.

4. Modularized function design enables the 5G core network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

FIG. 5 illustrates a 5G network architecture using service-based interfaces between the NFs in the CP, instead of the point-to-point reference points/interfaces used in the 5G network architecture of FIG. 4. However, the NFs described above with reference to FIG. 4 correspond to the NFs shown in FIG. 5. The service(s) etc. that a NF provides to other authorized NFs can be exposed to the authorized NFs through the service-based interface. In FIG. 5 the service based interfaces are indicated by the letter "N" followed by the name of the NF, e.g. Namf for the service based interface of the AMF and Nsmf for the service based interface of the SMF, etc. The Network Exposure Function (NEF) and the Network Repository Function (NRF) in FIG. 5 are not shown in FIG. 4 discussed above. However, it should be clarified that all NFs depicted in FIG. 4 can interact with the NEF and the NRF of FIG. 5 as necessary, though not explicitly indicated in FIG. 4.

Some properties of the NFs shown in FIGS. 4 and 5 may be described in the following manner. The AMF provides UE-based authentication, authorization, mobility management, etc. A UE using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

A NF may be implemented either as a network element on a dedicated hardware, as a software instance running on a dedicated hardware, or as a virtualized function instantiated on an appropriate platform, e.g., a cloud infrastructure.

Figure 6:
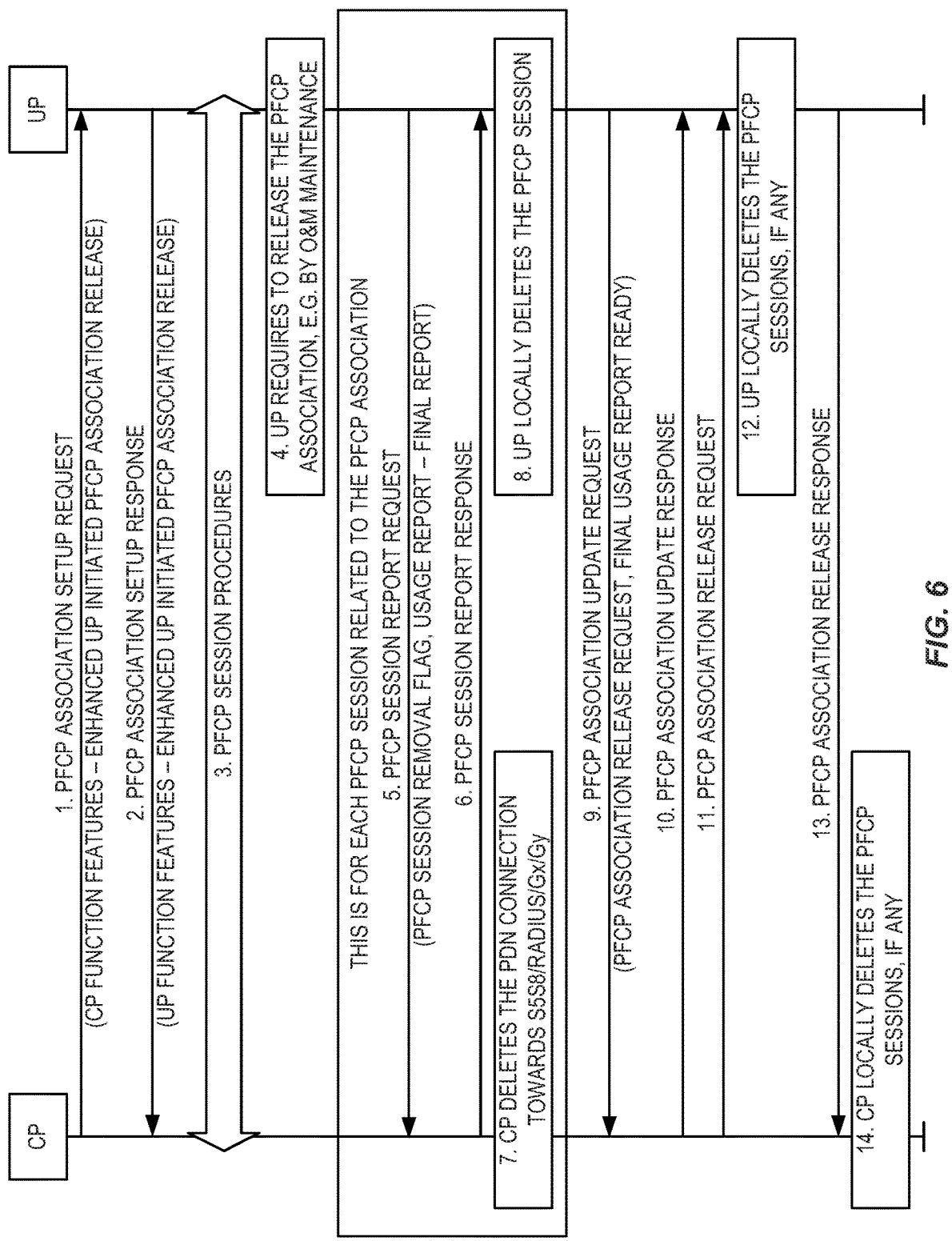
FIG. 6 illustrates the operation of a CP function and a UP function to perform a new PFCP association release procedure in accordance embodiments of the present disclosure.

FIG. 6 illustrates the operation of a CP function and a UPF to perform a new PFCP association release procedure in accordance embodiments of the present disclosure.

Steps 1 and 2: During a PFCP Association Setup procedure, the CP function and the UPF exchange, with each other, information that indicates whether they support Enhanced UP Function Initiated PFCP Association Release. Note that the PFCP Association Setup procedure can be initiated by either the CP function or the UPF. For example, the CP function may send a setup request (e.g., a PFCP Association Setup Request) to the UP function, which request comprises information indicating that the CP function supports Enhanced UP Function Initiated PFCP Association Release. Similarly, the UP function may send, in response to the setup request, a setup response (e.g., a PFCP Association Setup Response) to the CP function, which response comprises information indicating that the UP function supports Enhanced UP Function Initiated PFCP Association Release. Note that FIG. 6 illustrates an UP initiated PFCP association in which the UP function sends a PFCP association setup request to the CP and the CP function responds with a PFCP association setup response. However, the PFCP association may alternatively be initiated by the CP function, in which case the UP function sends the PFCP association setup request to the CP function and the CP function responds with a PFCP association setup response.

Step 3: The CP function establishes PFCP Sessions towards the UPF.

Step 4: The UPF desires (e.g., is required) to release the PFCP Association towards the CP function, e.g., for upgrade or other O&M reasons, to quit service, or the like.

For each PFCP session related to the PFCP Association:
Steps 5 and 6: In this example, the CP function (and the UPF) support Enhanced UP Function Initiated PFCP Association Release. As such, in step 5 the UPF sends a PFCP Session Report request message to the CP function for each PFCP session related to the PFCP Association. For each PFCP session, the respective PFCP Session Report request message includes (or is otherwise associated with):
a new indicator (e.g., flag), preferably called PFCP Session to be Deleted By the UP function (PSDBU), and
a number of non-zero usage reports (e.g., a usage report for each URR or similar of the PFCP session). Each usage report may include a new indicator (referred to herein as a usage report trigger) that indicates that the usage report is generated due to the deletion of the respective PFCP session affected by the release of the PFCP association. This new usage report trigger for the usage report may be referred to as a Session Termination By UP function (STEBU) trigger that, e.g., when set to a value of "1" indicates that the usage report is being reported for a URR due to the termination of the PFCP session which is initiated by the UE function. Note that a usage report indicates, e.g., the traffic usage of the PFCP session.
The PSDBU flag indicates that the PFCP session is being removed (i.e., indicating that the UPF has decided to remove/release the PFCP session). Further, the PSDBU flag can be a message level Information Element (IE), a new value of Report Type IE, or the like. It is preferred that the UP function sets the PSDBU flag to "1" to indicate to the CP function that the PFCP Session is to be deleted and preferably also to indicate that the usage reports included in the PFCP Session Report message are the final reports for the given PFCP Session. The usage report may be reported by, e.g., a new report trigger, preferably called a STEBU trigger, as discussed above. The non-zero usage reports comprise information indicating the usage of the PFCP session, e.g. indicating that the PFCP session has been used, e.g. used for transmitting data. In contrast, the zero usage reports (if any) comprise information indicating that the PFCP session has zero usage, e.g. indicating that the PFCP session has not been used e.g. not used for transmitting data. It is preferred that no corresponding zero usage reports are explicitly signaled or sent, since that would cause unnecessary signaling. The CP function sends a PFCP Session Report response to the UPF in step 6. In some embodiments, the PFCP Session Report response is an Acknowledgement (ACK).

Step 7: For each PFCP session related to the PFCP Association, upon receiving the PFCP Session Report request for the PFCP session with respective PFCP Session Removal flag, the CP function locally deletes the PFCP session, and terminates the user session accordingly, preferably during which the CP function will report the final data usage to Radius, PCRF, Online Charging System (OCS), etc.

Step 8: For each PFCP session related to the PFCP Association, the UPF locally deletes the PFCP session. This may, e.g., be done in response to receiving the PFCP Session Report response.

Steps 9 and 10: After all PFCP sessions related to the PFCP Association are deleted and/or the UPF has sent all non-zero usage reports for all the PFCP sessions affected by the release of PFCP Association to the CP function, the UP sends in step 9, to the CP function, a PFCP Association Update request, preferably with PFCP Association Release request (e.g., a PFCP Association Release request IE), to thereby request that the CP function initiates the PFCP Association release procedure. Preferably, the PFCP Association Update request includes (or is otherwise associated with) a new indicator (e.g., flag) set by the UPF that indicates, to the CP function, that all non-zero usage reports for the affected PFCP Sessions have already been reported. Preferably, the indicator is called non-zero Usage Reports for the affected PFCP Sessions Sent (URSS). Therefore, the CP function can safely locally delete all PFCP sessions affected by the release of PFCP association. The CP function returns a PFCP association update response to the UPF in step 10, e.g., to acknowledge receipt of the PFCP association update request.

Steps 11 through 14: The CP function initiates the PFCP Association release procedure, and both the CP function and the UPF locally delete the remaining PFCP sessions if any, e.g. for those PFCP sessions without any usage (thus no usage report generated). For example, the CP function may send a PFCP Association Release request towards the UP function in step 11. For example, the UP function may, e.g. in response to receiving the PFCP association update response (step 10) or in response to receiving the PFCP Association Release request (step 11), delete any remaining PFCP session in step 12 (e.g. PFCP session(s) with zero usage). For example, the UP function may send a PFCP Association Release response towards the CP function in step 13. For example, the CP function may, e.g. in response to receiving the PFCP association update request (step 9) or in response to receiving the PFCP Association Release response (step 13), delete any remaining PFCP session in step 14 (e.g. PFCP session(s) with zero usage).

Additional details for one example implementation of at least some aspects of the embodiments described herein are provided in the Appendix.

Figure 7:
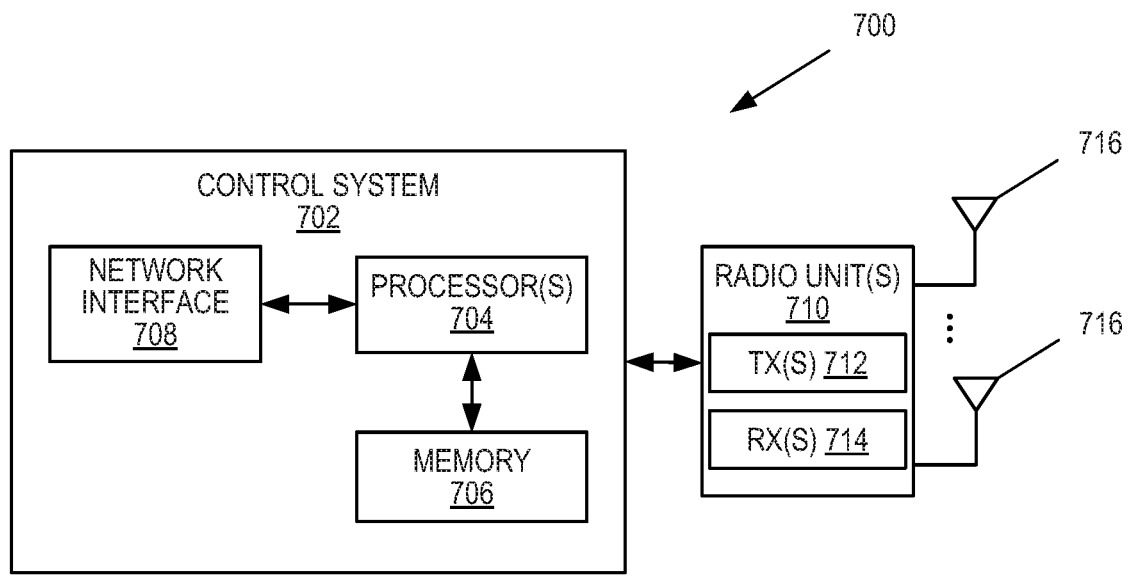
FIG. 7 is a schematic block diagram of a network node according to some embodiments of the present disclosure.

FIG. 7 is a schematic block diagram of a network node 700 according to some embodiments of the present disclosure. The network node 700 is a network node that implements one or more CPEs 314 and/or one or more UPEs 316 in accordance with any of the embodiments disclosed herein. As illustrated, the network node 700 includes one or more processors 702 (e.g., CPUs, Application Specific Integrated Circuits (ASICs), Field Programmable Gate Arrays (FPGAs), and/or the like), memory 704, and a network interface 706. The one or more processors 702 are also referred to herein as processing circuitry. The one or more processors 702 operate to provide one or more functions of CPE 314 and/or a UPE 316 as described herein (e.g., one or more functions of the CP and/or the UP described above, e.g., with respect to FIG. 6). In some embodiments, the function(s) are implemented in software that is stored, e.g., in the memory 704 and executed by the one or more processors 702.

Figure 8:
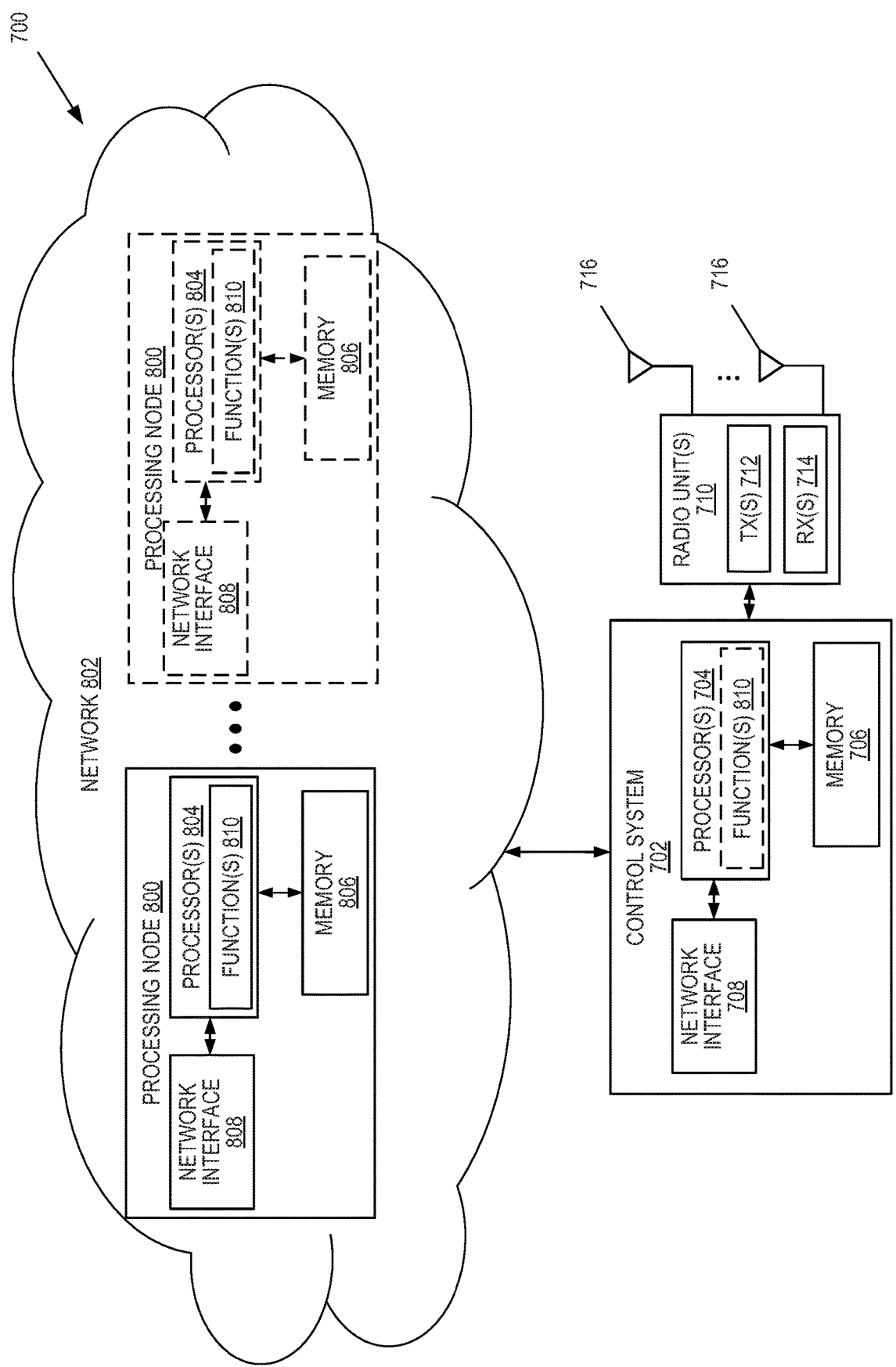
FIG. 8 is a schematic block diagram that illustrates a virtualized embodiment of the network node of FIG. 7 according to some embodiments of the present disclosure.

FIG. 8 is a schematic block diagram that illustrates a virtualized embodiment of the network node 700 according to some embodiments of the present disclosure. This discussion is equally applicable to other types of network nodes. Further, other types of network nodes may have similar virtualized architectures.

As used herein, a "virtualized" network node is an implementation of the network node 700 in which at least a portion of the functionality of the network node 700 is implemented as a virtual component(s) (e.g., via a virtual machine(s) executing on a physical processing node(s) in a network(s)). As illustrated, in this example, the network node 700 includes one or more processing nodes 800 coupled to or included as part of a network(s) 802 via the network interface 708. Each processing node 800 includes one or more processors 804 (e.g., CPUs, ASICs, FPGAs, and/or the like), memory 806, and a network interface 808.

In this example, functions 810 of the network node 700 described herein (e.g., the functions of the CPE 314 and/or the functions of the UPE 316 such as one or more functions of the CP and/or the UP described above, e.g., with respect to FIG. 6) are implemented at the one or more processing nodes 800 or distributed across the one or more processing nodes 800 in any desired manner. In some particular embodiments, some or all of the functions 810 of the radio access node 700 described herein are implemented as virtual components executed by one or more virtual machines implemented in a virtual environment(s) hosted by the processing node(s) 800.

In some embodiments, a computer program including instructions which, when executed by at least one processor, causes the at least one processor to carry out the functionality of network node 700 or a node (e.g., a processing node 800) implementing one or more of the functions 810 of the network node 700 in a virtual environment according to any of the embodiments described herein (e.g., one or more functions of the CP and/or the UP described above, e.g., with respect to FIG. 6) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
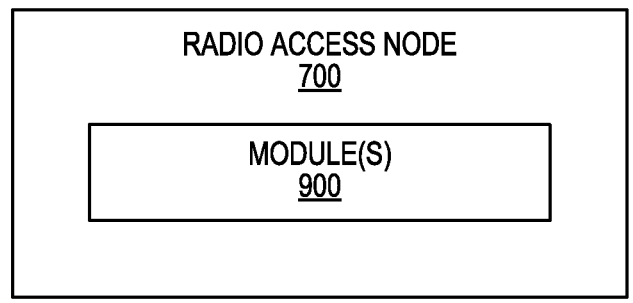
FIG. 9 is a schematic block diagram of the network node of FIG. 7 according to some other embodiments of the present disclosure.

FIG. 9 is a schematic block diagram of the network node 700 according to some other embodiments of the present disclosure. The network node 700 includes one or more modules 900, each of which is implemented in software. The module(s) 900 provide the functionality of the network node 700 described herein and, in particular, the functionality of the CPE(s) 314 and/or the UPE(s) 316 described herein (e.g., the functions of the CPE 314 and/or the functions of the UPE 316 such as one or more functions of the CP and/or the UP described above, e.g., with respect to FIG. 6).

Some of the embodiments that are disclosed above may be summarized in the following itemized manner:

Item 1. A method performed in a User Plane Entity, UPE, in a core network of a cellular communications system to perform a user plane requested, Packet Forwarding Control Protocol, PFCP, association release procedure, comprising at least one of the following:

for each PFCP session of one or more PFCP sessions affected by release of a PFCP association:

sending (step 5, FIG. 6) towards a Control Plane Entity, CPE, a PFCP session report request for the PFCP session, the PFCP session report request comprising:
one or more non-zero usage reports for the PFCP session; and
an indicator which indicates that the PFCP session is being removed and that the usage reports are the final for the given PFCP session;
receiving (step 6, FIG. 6) a corresponding PFCP session report response message for the PFCP session; and
deleting (step 8, FIG. 6) the PFCP session at the UPE;
optionally, sending (step 9, FIG. 6), towards the CPE, a PFCP association update request to request the CPE to release the PFCP association, the PFCP association update request comprising:
an indicator that all non-zero usage reports for the one or more PFCP sessions affected by release of the PFCP association have been reported;
optionally, receiving (step 11, FIG. 6) a PFCP association release request sent by the CPE; and
optionally sending (step 13, FIG. 6), towards the CPE, a PFCP association release response.

Item 2. The method of item 1 further comprising, prior to sending the PFCP session report request for each PFCP session of the one or more PFCP sessions affected by release of the PFCP association:
receiving (step 1, FIG. 6), from the CPE, a PFCP association setup request or a PFCP association setup response for the PFCP association to be established that comprises or is otherwise associated with an indicator that the CPE supports an enhanced user plane initiated PFCP association release procedure; and
sending, to the CPE, a PFCP association setup response or a PFCP association setup request for the PFCP association to be established that comprises or is otherwise associated with an indicator that the UPE supports the enhanced user plane initiated PFCP association release procedure;
wherein the steps of claim 1 are performed upon determining, by the UPE, that:
release of the PFCP association is needed; and
both the UPE and the CPE support the enhanced user plane initiated PFCP association release procedure.

Item 3. The method of item 1 or 2 wherein:
the UPE is a Serving Gateway User Plane, SGW-U, and the CPE is a Serving Gateway Control Plane, SGW-C, in an Evolved Packet Core, EPC, having a Control and User Plane Separation, CUPS, architecture; or
the UPE is a Packet Data Network User Plane, PGW-U, and the CPE is a Packet Data Network Control Plane, PGW-C, in an EPC having a CUPS architecture; or
the UPE is a Traffic Detection Function User Plane, TDF-U, and the CPE is a Traffic Detection Function Control Plane, TDF-C, in an EPC having a CUPS architecture; or
the UPE is a User Plane Function, a UPF, and the CPF is a Session Management Function, SMF, in 5GC.

Item 4. The method of item 1 or 2 wherein the UPE is a User Plane Function, UPF, in a Fifth Generation Core, 5GC or in the Evolved Packet Core, EPC, and the CPE is a control plane Network Function, NF, in the 5GC or in the Evolved Packet Core, EPC.

Item 5. A method performed in a Control Plane Entity, CPE, in a core network of a cellular communications system to perform a user plane requested Packet Forwarding Control Protocol, PFCP, association release procedure, comprising at least one of the following:
for each PFCP session of one or more PFCP sessions affected by release of a PFCP association:
receiving (step 5, FIG. 6) a PFCP session report request for the PFCP session sent by a User Plane Entity, UPE, the PFCP session report request comprising:
one or more non-zero usage reports for the PFCP session; and
an indicator which indicates that the PFCP session is being removed;
sending (step 6, FIG. 6) a PFCP session report response message to confirm the receiving the final usage reports for the PFCP session; and
deleting (step 7, FIG. 6) the PFCP session at the CPE;
optionally, receiving (step 9, FIG. 6) a PFCP association update request sent by a User Plane Entity, UPE, which PFCP association update request indicates a request to release the PFCP association comprising:
an indicator which indicates that all non-zero usage reports for the one or more PFCP sessions affected by release of the PFCP association have been reported;
optionally, sending (step 11, FIG. 6), towards the UPE, a PFCP association release request; and
optionally, receiving (step 13, FIG. 6) a PFCP association release response sent by the UPE.

Item 6. The method of item 5 further comprising, for each PFCP session of one or more PFCP sessions affected by release of a PFCP association, terminating (step 7, FIG. 6) a Packet Data Network, PDN, connection for the PFCP session.

Item 7. The method of item 5 or 6 further comprising, prior to receiving the PFCP session report request for each PFCP session of the one or more PFCP sessions affected by release of the PFCP association:
sending, to the UPE, a PFCP association setup request or a PFCP association setup response for the PFCP association to be established that comprises or is otherwise associated with an indicator that the CPE supports an enhanced user plane initiated PFCP association release procedure; and
receiving, from the UPE, a PFCP association setup response or a PFCP association setup request for the PFCP association to be established that comprises or is otherwise associated with an indicator that the UPE supports the enhanced user plane initiated PFCP association release procedure;
wherein the steps of claim 5 or 6 are performed upon determining, by the CPE, that both the UPE and the CPE support the enhanced user plane initiated PFCP association release procedure.

Item 8. The method of any one of item 5 to 7 wherein:
the UPE is a Serving Gateway User Plane, SGW-U, and the CPE is a Serving Gateway Control Plane, SGW-C, in an Evolved Packet Core, EPC, having a Control and User Plane Separation, CUPS, architecture; or
the UPE is a PDN Gateway User Plane, PGW-U, and the CPE is a PDN Gateway Control Plane, PGW-C, in an EPC having a CUPS architecture; or
the UPE is a Traffic Detection Function User Plane, TDF-U, and the CPE is a Traffic Detection Function Control Plane, TDF-C, in an EPC having a CUPS architecture; or
the UPE is a User Plane Function, a UPF, and the CPF is a Session Management Function, SMF, in 5GC.

Item 9. The method of any one of item 5 to 7 wherein the UPE is a User Plane Function, UPF, in a Fifth Generation Core, 5GC or in a Evolved Packet Core, EPC, and the CPE is a control plane Network Function, NF, in the 5GC or in a Evolved Packet Core, EPC.

Item 10. A network node that implements a User Plane Entity, UPE, for performing a user plane requested Packet Forwarding Control Protocol, PFCP, association release procedure in a core network of a cellular communications system, the UPE adapted to perform the method of any one of item 1 to 4.

Item 11. A network node that implements a User Plane Entity, UPE, for performing a user plane requested Packet Forwarding Control Protocol, PFCP, association release procedure in a core network of a cellular communications system, the network node comprising:
    processing circuitry configured to cause the network node to perform the method of any one of item 1 to 4.

Item 12. A network node that implements a Control Plane Entity, CPE, for performing a user plane requested Packet Forwarding Control Protocol, PFCP, association release procedure in a core network of a cellular communications system, the CPE adapted to perform the method of any one of item 5 to 9.

Item 13. A network node that implements a Control Plane Entity, CPE, for performing a user plane requested Packet Forwarding Control Protocol, PFCP, association release procedure in a core network of a cellular communications system, the network node comprising:
    processing circuitry configured to cause the network node to perform the method of any one of item 5 to 9.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).
    3GPP Third Generation Partnership Project
    5G Fifth Generation
    5GC Fifth Generation Core
    ACK Acknowledgement
    AF Application Function
    AMF Access and Mobility Management Function
    AN Access Network
    ASIC Application Specific Integrated Circuit
    AUSF Authentication Server Function
    CDR Charging Data Record
    CP Control Plane
    CPE Control Plane Entity
    CPU Central Processing Unit
    CUPS Control and User Plane Separation
    DHCP Dynamic Host Configuration Protocol
    DN Data Network
    DNS Domain Name System
    eNB Enhanced or Evolved Node B
    EPC Evolved Packet Core
    FAR Forwarding Action Rule
    FPGA Field Programmable Gate Array
    F-TEID Fully Qualified Tunnel Endpoint Identifier
    gNB New Radio Base Station
    GRP Graceful Release Period
    GTP-C General Packet Radio Service Tunneling Protocol Control Plane
    GTP-U General Packet Radio Service Tunneling Protocol User Plane
    IE Information Element
    IP Internet Protocol
    LTE Long Term Evolution
    MME Mobility Management Entity
    MTC Machine Type Communication
    NEF Network Exposure Function
    NF Network Function
    NR New Radio
    NRF Network Repository Function
    NSSF Network Slice Selection Function
    O&M Operation and Maintenance
    OCS Online Charging System
    OFCS Offline Charging System
    PCC Primary Component Carrier
    PCF Policy Control Function
    PCRF Policy and Charging Rules Function
    PDN Packet Data Network
    PDR Packet Detection Rule
    PFCP Packet Forwarding Control Protocol
    PFD Packet Flow Description
    P-GW Packet Data Network Gateway
    PGW-C Packet Data Network Gateway Control Plane
    PGW-U Packet Data Network Gateway User Plane
    PSDBU Packet Forwarding Control Protocol Session to be Deleted by the User Plane
    QER Quality of Service Enforcement Rule
    QoS Quality of Service
    RA Router Advertisement
    RAM Random Access Memory
    RAN Radio Access Network
    ROM Read Only Memory
    RRH Remote Radio Head
    RS Router Solicitation
    RTT Round Trip Time
    SCEF Service Capability Exposure Function
    SDCI Sponsored Data Connectivity Improvement
    S-GW Serving Gateway
    SGW-C Serving Gateway Control Plane
    SGW-U Serving Gateway User Plane
    SMF Session Management Function
    STEBU Session Termination by User Plane
    TDF Traffic Detection Function
    TDF-C Traffic Detection Function Control Plane TDF-U Traffic Detection Function User Plane
TLV Type-Length-Value
TS Technical Specification
UDM Unified Data Management
UDP User Datagram Protocol
UE User Equipment
UP User Plane
UPE User Plane Entity
UPF User Plane Function
URR Usage Reporting Rule Those skilled in the art will recognize improvements and modifications to the embodiments of the present disclosure. All such improvements and modifications are considered within the scope of the concepts disclosed herein.

What is claimed is:

1. A method performed in a User Plane Entity, UPE, in a core network of a cellular communications system to perform a user plane requested, Packet Forwarding Control Protocol, PFCP, association release procedure, the method comprising:
   for each PFCP session with non-zero usage reports but not for PFCP sessions with zero usage reports of one or more PFCP sessions affected by release of a PFCP association:
      sending towards a Control Plane Entity, CPE, a PFCP session report request for the PFCP session, the PFCP session report request comprising:
         one or more non-zero usage reports for the PFCP session; and
         an indicator which indicates that the PFCP session is being removed and that the one or more non-zero usage reports are the final for the given PFCP session;
      receiving a corresponding PFCP session report response message for the PFCP session sent by the CPE to confirm the receiving of said final one or more non-zero usage reports for the PFCP session;
      deleting the PFCP session at the UPE;
      sending towards CPE a PFCP association update request that requests the CPE to release the PFCP association, which PFCP association update request comprises an indicator which indicates that all non-zero usage reports for the one or more PFCP sessions affected by release of the PFCP association have been reported;
      receiving a PFCP association update response returned by the CPE;
      receiving a PFCP association release request sent by the CPE;
   deleting any remaining PCFP session; and
      sending a PFCP association release response towards the CPE.

2. The method according to claim 1 further comprising, prior to sending the PFCP session report request for each PFCP session of the one or more PFCP sessions affected by release of the PFCP association:
   receiving, from the CPE, a PFCP association setup request or a PFCP association setup response for the PFCP association to be established that comprises or is otherwise associated with an indicator that the CPE supports an enhanced user plane initiated PFCP association release procedure; and
   sending, to the CPE, a PFCP association setup response or a PFCP association setup request for the PFCP association to be established that comprises or is otherwise associated with an indicator that the UPE supports the enhanced user plane initiated PFCP association release procedure;
   wherein the steps of claim 1 are performed upon determining, by the UPE, that:
      release of the PFCP association is needed; and
      both the UPE and the CPE support the enhanced user plane initiated PFCP association release procedure.

3. The method according to claim 1 wherein the UPE is a User Plane Function, UPF, in a Fifth Generation Core, 5GC or in the Evolved Packet Core, EPC, and the CPE is a control plane Network Function, NF, in the 5GC or in the Evolved Packet Core, EPC.

4. A method performed in a Control Plane Entity, CPE, in a core network of a cellular communications system to perform a user plane requested Packet Forwarding Control Protocol, PFCP, association release procedure, the method comprising:
   for each PFCP session with non-zero usage reports but not for PFCP sessions with zero usage reports of one or more PFCP sessions affected by release of a PFCP association:
      receiving a PFCP session report request for the PFCP session sent by a User Plane Entity, UPE, the PFCP session report request comprising:
         one or more non-zero usage reports for the PFCP session; and
         an indicator which indicates that the PFCP session is being removed and that the one or more non-zero usage reports are the final for a given PFCP session;
      sending towards the UPE a PFCP session report response message to confirm the receiving of said final one or more non-zero usage reports for the PFCP session; and
      deleting the PFCP session at the CPE;
   receiving from the UPE a PFCP association update request that requests the CPE to release the PFCP association, which PFCP association update request comprises an indicator which indicates that all non-zero usage reports for the one or more PFCP sessions affected by release of the PFCP association have been reported;
   returning a PFCP association update response to the UPE;
   sending towards the UPE a PFCP association release request; and
   receiving a PFCP association release response sent by the CPE.

5. The method according to claim 4, further comprising, for each PFCP session of one or more PFCP sessions affected by release of a PFCP association, terminating a Packet Data Network, PDN, connection for the PFCP session.

6. The method according to claim 4 further comprising, prior to receiving the PFCP session report request for each PFCP session of the one or more PFCP sessions affected by release of the PFCP association:
   sending, to the UPE, a PFCP association setup request or a PFCP association setup response for the PFCP association to be established that comprises or is otherwise associated with an indicator that the CPE supports an enhanced user plane initiated PFCP association release procedure; and
   receiving, from the UPE, a PFCP association setup response or a PFCP association setup request for the PFCP association to be established that comprises or is otherwise associated with an indicator that the UPE supports the enhanced user plane initiated PFCP association release procedure;

wherein the steps of claim 4 are performed upon determining, by the CPE, that both the UPE and the CPE support the enhanced user plane initiated PFCP association release procedure.

7. The method according to claim 4 wherein the UPE is a User Plane Function, UPF, in a Fifth Generation Core, 5GC or in a Evolved Packet Core, EPC, and the CPE is a control plane Network Function, NF, in the 5GC or in a Evolved Packet Core, EPC.

8. A network node that implements a User Plane Entity, UPE, for performing a user plane requested Packet Forwarding Control Protocol, PFCP, association release procedure in a core network of a cellular communications system, the UPE adapted to perform the method according to claim 1.

9. A network node that implements a Control Plane Entity, CPE, for performing a user plane requested Packet Forwarding Control Protocol, PFCP, association release procedure in a core network of a cellular communications system, the CPE adapted to perform the method according to claim 4.

\* \* \* \* \*